United States Patent
Lau et al.

(10) Patent No.: US 9,060,366 B2
(45) Date of Patent: Jun. 16, 2015

(54) MAINTAINING CONNECTIVITY DURING CALL-SETUP

(71) Applicants: Verizon Patent and Licensing Inc., Basking Ridge, NJ (US); Cellco Partnership, Basking Ridge, NJ (US)

(72) Inventors: Priscilla Lau, Fremont, CA (US); Nirav K Patel, Atlanta, GA (US); Mingxing S Li, San Jose, CA (US); Niranjan B Avula, Frisco, TX (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 185 days.

(21) Appl. No.: 13/921,793

(22) Filed: Jun. 19, 2013

(65) Prior Publication Data

US 2014/0378149 A1 Dec. 25, 2014

(51) Int. Cl.
*H04W 72/00* (2009.01)
*H04W 76/04* (2009.01)
*H04W 4/16* (2009.01)

(52) U.S. Cl.
CPC .............. *H04W 76/045* (2013.01); *H04W 4/16* (2013.01)

(58) Field of Classification Search
None
See application file for complete search history.

(56) References Cited

U.S. PATENT DOCUMENTS

2010/0255831 A1* 10/2010 Shuman et al. ............... 455/423

* cited by examiner

*Primary Examiner* — Suhail Khan

(57) ABSTRACT

A server device may receive a call setup request from a first user device; provide the call setup request towards a second user device; receive a provisional response message based on providing the call setup request; and provide the provisional response message towards the first user device. The first or second user device may be connected to a network device to provide or receive the call setup request, the provisional, a response to the call setup request, or an acknowledgement. The server device may provide, based on receiving the call setup request or the provisional response, one or more messages towards the first user device or towards the second user device to prevent the first or second user device from disconnecting from the network device, to reduce a delay in receiving by the first user device, the provisional response and the response to the call setup request.

20 Claims, 8 Drawing Sheets

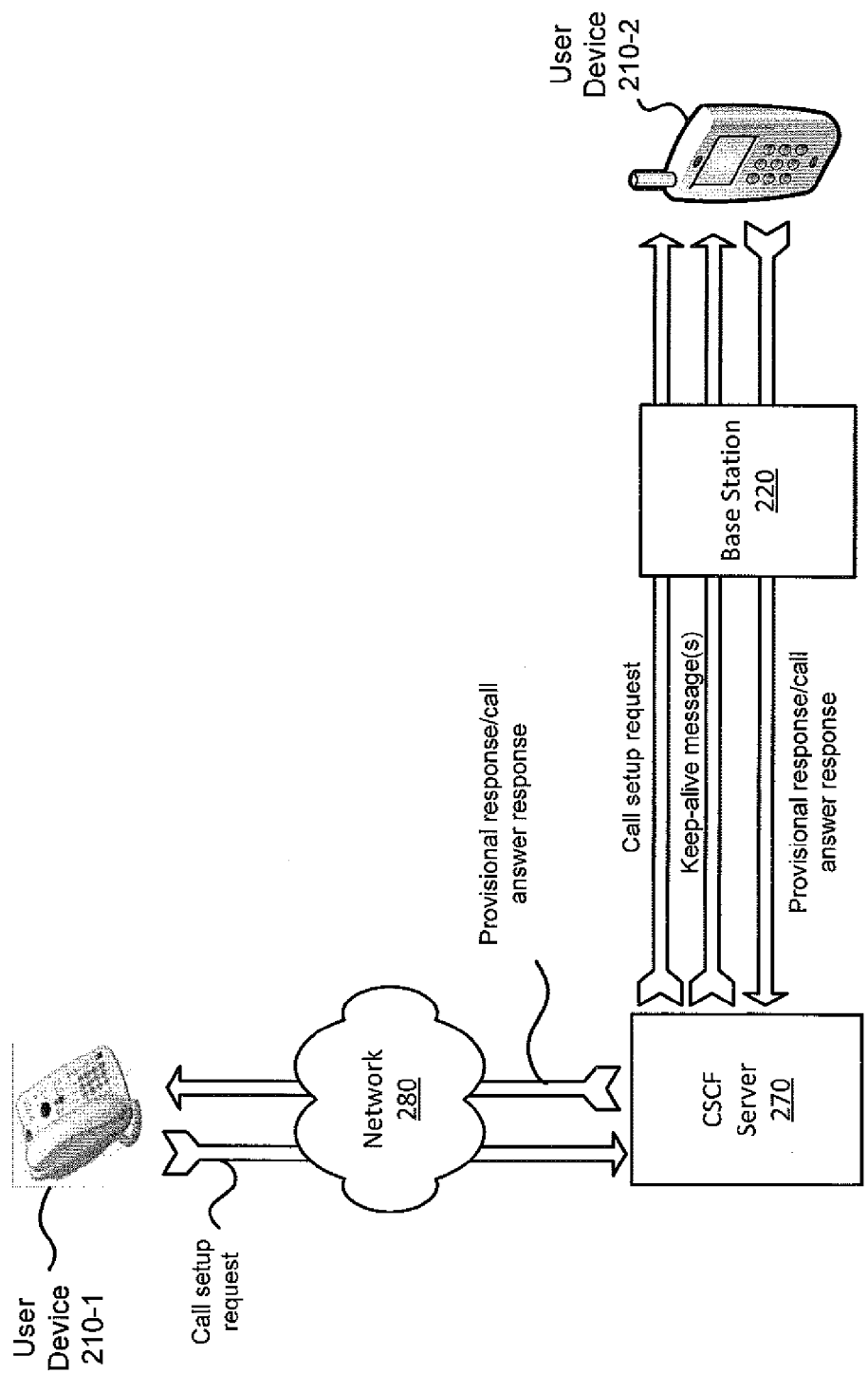

MAINTAINING CONNECTIVITY DURING CALL-SETUP

BACKGROUND

User devices sometimes connect to a wireless network (e.g., via a base station) to transmit/receive telephone call invitations to/from other user devices. To save radio resources, a wireless network sometimes disconnects the radio connection between a user device and the base station when the user device enters a state of inactivity (e.g., when the user device has not sent or received data via the wireless network for a particular period of time). After sending a call setup request to the wireless network, the calling user device may enter a state of inactivity while waiting to receive a response from a recipient of the call setup invitation (e.g., called user device), thereby being disconnected from the base station. As a result, the network may need to page the calling user device and the calling user device may need to reestablish the radio connection with base station in order to receive the response from the recipient, thereby increasing a cycle time for establishing a call with the recipient. For a voice over IP (VoIP) call, the increase in cycle delay may cause voice clipping.

BRIEF DESCRIPTION OF THE DRAWINGS

FIGS. 5A-5C illustrate example implementations as described herein.

DETAILED DESCRIPTION OF THE PREFERRED EMBODIMENTS

The following detailed description refers to the accompanying drawings. The same reference numbers in different drawings may identify the same or similar elements.

Systems and/or methods, described herein, may prevent a base station from disconnecting a radio connection with a sending user device when the sending user device provides an instruction to place a call to a receiving user device. Additionally or alternatively, the systems and/or methods may prevent a base station from disconnecting a radio connection with a receiving user device (e.g., when the receiving user device awaits a response to an incoming call request from a user). As a result, a cycle time to establish the call may be reduced, thereby reducing instances of voice-clipping and/or reducing a delay between a time in which the sending user device receives an indication that the receiving user device has been alerted of a call instruction (e.g., when the receiving user device has started alerting the called user, such as by providing a ring tone audible to the user) and a time in which the sending user device receives an indication that the receiving user device has answered the call instruction.

Figure 1A:
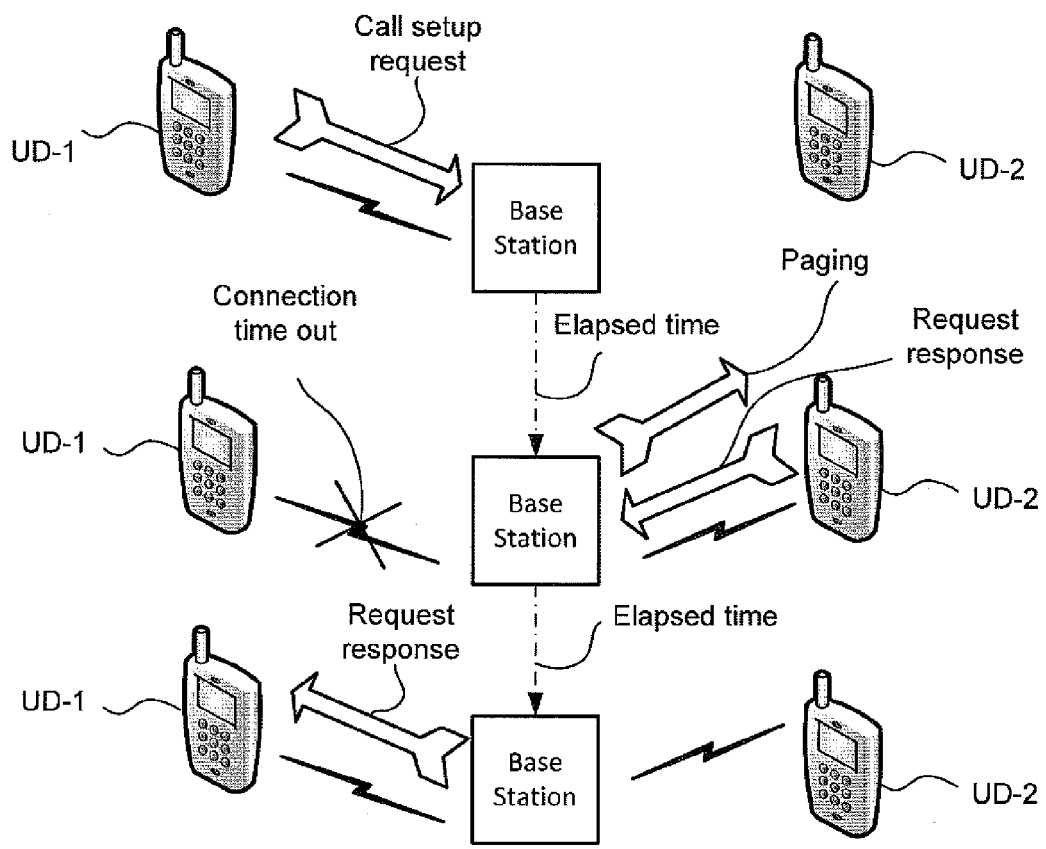
FIGS. 1A-1B illustrate an example overview of an implementation described herein.
Figure 1B:
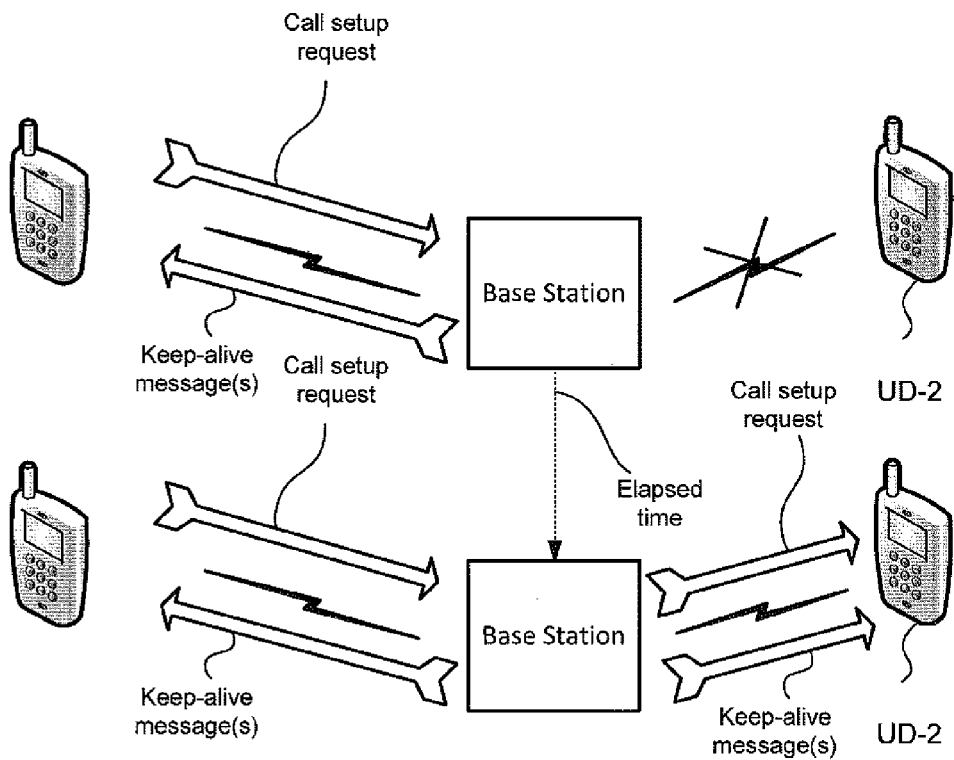

FIGS. 1A-1B illustrate an example overview of an implementation described herein. As shown in FIG. 1A, a first user device (e.g., UD-1) may connect with a base station to transmit a call setup request to a second user device (e.g., UD-2). In some implementations, UD-2 may receive the call setup request from UD-1 after a delay. For example, UD-2 may be disconnected from the base station at the time that the call set up request was received by the base station. In some implementations, (e.g., when UD-2 is disconnected from the base station) the base station may locate/page UD-2, established a radio connection between the base station and UD-2, and deliver the call setup request to UD-2. As a result, UD-2 may not provide a response to the call setup request in a timely manner, thereby causing a connection between UD-1 and the base station to time out when an inactivity period elapses.

As shown in FIG. 1A, UD-1 may be disconnected from the base station prior to receiving the response (e.g., since the response was provided by UD-2 after the connection timeout period had elapsed). As a result, the base station may need to locate/page UD-1 in order to reestablish the radio connection between the base station and UD-1 in order for UD-1 to receive the response from UD-2, thereby causing a delay in establishing a call session between UD-1 and UD-2.

Referring now to FIG. 1B, UD-1 may receive one or more keep-alive messages via the base station when UD-1 provides a call setup request to UD-2. In some implementations, the keep-alive messages may prevent UD-1 from disconnecting from the base station, thereby preventing UD-1 from needing to reestablish the connection with the base station to receive a response from UD-2. As a result, a delay in establishing a call session between UD-1 and UD-2 may be reduced. As further shown in FIG. 1B, UD-2 may receive one or more keep-alive messages based on receiving the call setup request to prevent UD-2 from disconnecting from the base station. For example, the keep-alive message, received by UD-2, may prevent UD-2 from disconnecting from the base station while UD-2 awaits an instruction (e.g., acceptance of the incoming call) from a user after UD-2 to send a provisional response (e.g., call altering) to the call setup request to UD-1. As a result, delay for call setup time is reduced. Furthermore, voice-clipping that occurs when the called user starts talking and the connection is not yet established end-to-end may be avoided or reduced as a result of a reduction in time elapsed between when UD-2 provides the call answer respond and when UD-1 receives the response from UD-2.

Figure 2:
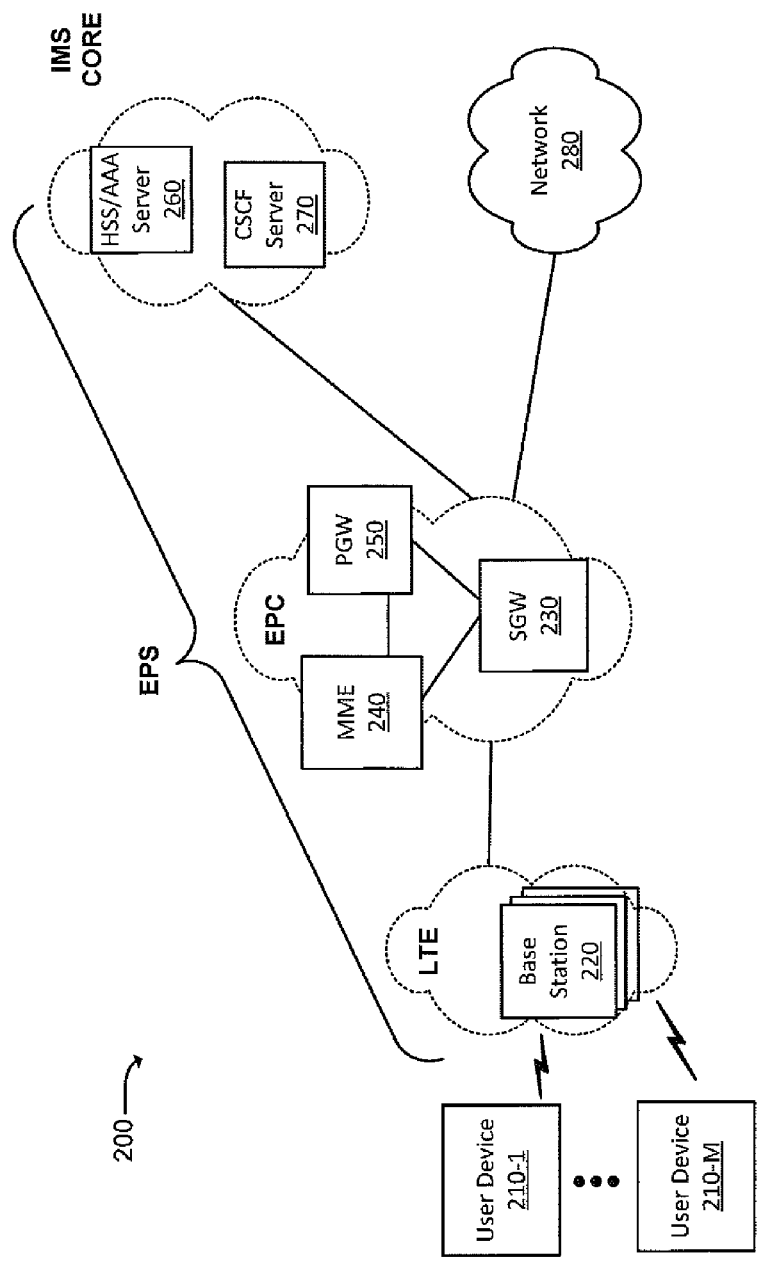
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210, . . . , 210-M (where M≥1), a base station 220, a serving gateway 230 (referred to as "SGW 230"), a mobility management entity device 240 (referred to as "MME 240"), a packet data network (PDN) gateway (PGW) 250, a home subscriber server (HSS)/authentication, authorization, accounting (AAA) server 260 (referred to as an "HSS/AAA server 260"), a call service control function (CSCF) server 270 (referred to as "CSCF server 270"), and a network 280.

Environment 200 may include an evolved packet system (EPS) that includes a long term evolution (LTE) network, an evolved packet core (EPC), and/or an Internet protocol (IP) multimedia subsystem (IMS) core that operate based on a third generation partnership project (3GPP) wireless communication standard. The LTE network may be a radio access network (RAN) that includes one or more base stations, such as eNodeBs (eNBs), via which user device 210 communicates with the EPC. The EPC may include SGW 230, MME 240, and/or PGW 250 and may enable user device 210 to communicate with network 280 and/or an IMS core. The IMS core may include HSS/AAA server 260 that may manage authentication, connection initiation, account information, a user profile, etc. associated with user device 210 and/or CSCF server 270 that may manage call/session setup and release from/to a user. As shown in FIG. 2, the LTE network may include base station 220.

User device 210 may include any computation or communication device, such as a wireless mobile communication device that is capable of communicating with base station 220 and/or a network (e.g., network 280). For example, user device 210 may include a radiotelephone, a voice over IP (VoIP) communications device, a landline telephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart telephone, a laptop computer, a tablet computer, a personal gaming system, or another type of computation or communication device. User device 210 may transmit data to and/or receive data from network 280.

As used herein, the term "data" is used to refer to any information sent/received by the user device, including analog signal or packet data.

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or transmit traffic to network 280 via SGW 230 and PGW 250. Base station 220 may transmit traffic to and/or receive traffic from user device 210 via an air interface. One or more of base stations 220 may be associated with a RAN, such as the LTE network.

In some implementations, base station 220 may include an inactivity timer that may reset when traffic is transmitted to/from user device 210. In some implementations, base station 220 may disconnect with user device 210 when an inactivity time period has elapsed (e.g., when the inactivity timer has surpassed a particular amount of time, such as 5 seconds, 10 seconds, or some other amount of time). In some implementations, the inactivity time period may be a design decision based on network traffic limits, security protocols, and/or other factors.

SGW 230 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may transmit the aggregated traffic to network 280 via PGW 250. In one example implementation, SGW 230 may route and forward user data packets, may act as a mobility anchor for a user plane during inter-eNB handovers, and may act as an anchor for mobility between LTE and other 3GPP technologies.

MME 240 may include one or more network devices that perform operations associated with a handoff to and/or from the EPS. MME 240 may perform operations to register user device 210 with the EPS, to handoff user device 210 from the EPS to another network, to handoff a user device 210 from the other network to the EPS, and/or to perform other operations. MME 240 may perform policing operations for traffic destined for and/or received from user device 210. MME 240 may authenticate user device 210 (e.g., via interaction with HSS/AAA server 260).

PGW 250 may include one or more network devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 210 to external packet data networks by being a traffic exit/entry point for user device 210. PGW 250 may perform policy enforcement, packet filtering, charging support, lawful intercept, and/or packet screening. PGW 250 may also act as an anchor for mobility between 3GPP and non-3GPP technologies.

HSS/AAA server 260 may include one or more computing devices, such as a server device or a collection of server devices. In some implementations, HSS/AAA server 260 may manage, update, and/or store, in a memory associated with HSS/AAA server 260, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. Additionally, or alternatively, HSS/AAA server 260 may include a device that performs authentication, authorization, and/or accounting (AAA) operations associated with a communication connection with user device 210.

CSCF server 270 may include one or more computing devices, such as a server device or a collection of server devices. In some implementations, CSCF server 270 may process and/or route calls to and from user device 210 via the EPC. For example, CSCF server 270 may process calls, received from network 280, that are destined for user device 210. Additionally or alternatively, CSCF server 270 may process calls, received from user device 210, that are destined for network 280. In some implementations, CSCF server 270 may include a telephony application server (TAS), a provisioning-CSCF (P-CSCF) and/or a serving-CSCF (S-CSCF).

In some implementations, CSCF server 270 may provide, to a sending user device 210, a keep-alive message based on receiving a call setup request from the sending user device 210 (e.g., to prevent the sending user device 210 from disconnecting from base station 220 while awaiting a response to the call setup request). Additionally or alternatively, CSCF server 270 may provide, to receiving user device 210, a keep-alive message based on providing the call setup request to the receiving user device 210 (e.g., to prevent the receiving user device 210 from disconnecting from base station 220 while awaiting a call answer response message from a user at the receiving user device in response to the call setup request). In some implementations, CSCF server 270 may store information that identifies a timeout period in which base station 220 disconnects from user device 210 such that CSCF server 270 may transmit the keep-alive message prior to the timeout period.

Network 280 may include one or more wired and/or wireless networks. For example, network 280 may include a cellular network, a public land mobile network (PLMN), a second generation (2G) network, a third generation (3G) network, a fourth generation (4G) network, a fifth generation (5G) network, and/or another network. Additionally, or alternatively, network 280 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
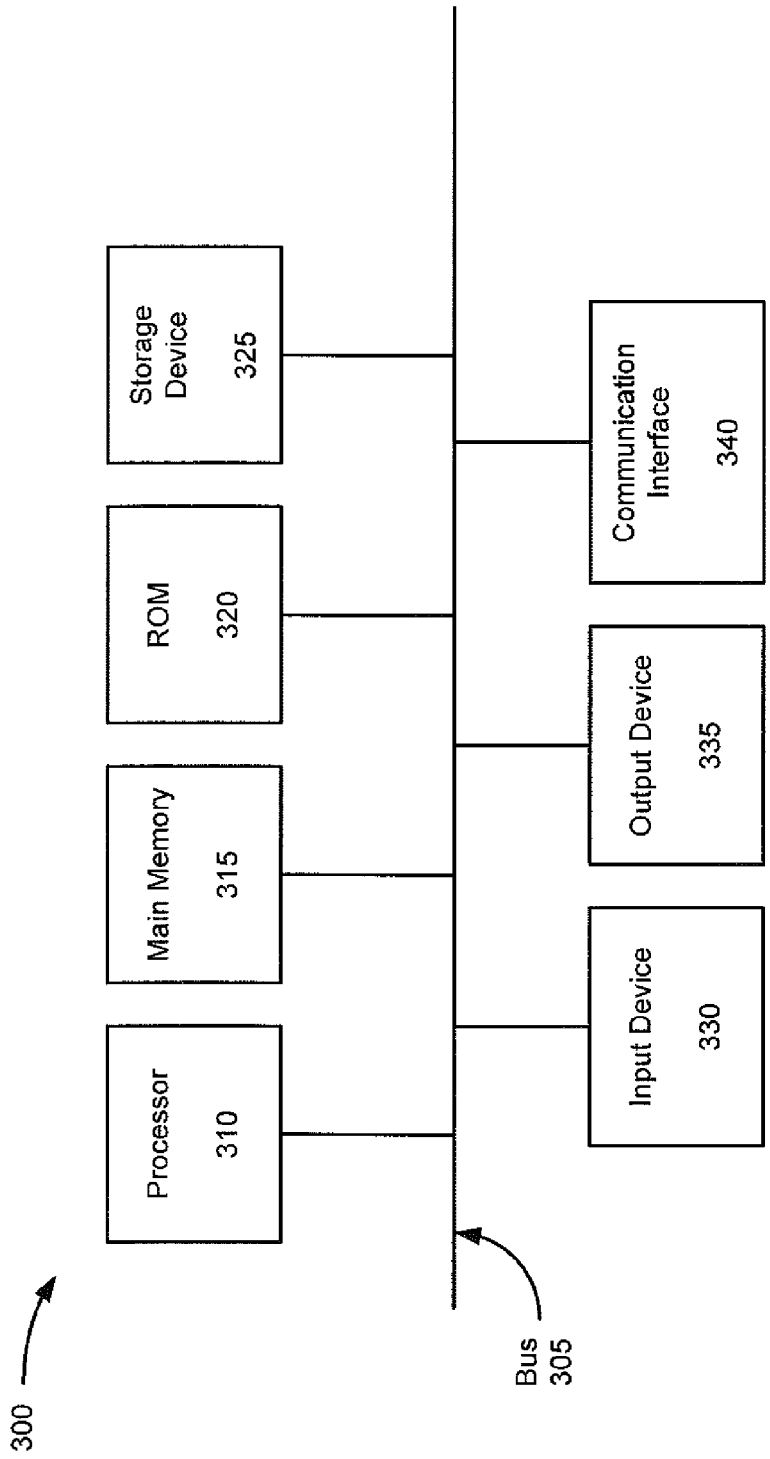
FIG. 3 illustrates example components of a device that may be used within the environment of FIG. 2.

FIG. 3 illustrates example components of a device 300 that may be used within environment 200 of FIG. 2. Device 300 may correspond to user device 210, base station 220, SGW 230, MME 240, PGW 250, HSS/AAA server 260, and/or CSCF server 270. Each of user device 210, base station 220, SGW 230, MME 240, PGW 250, HSS/AAA server 260, and/or CSCF server 270 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
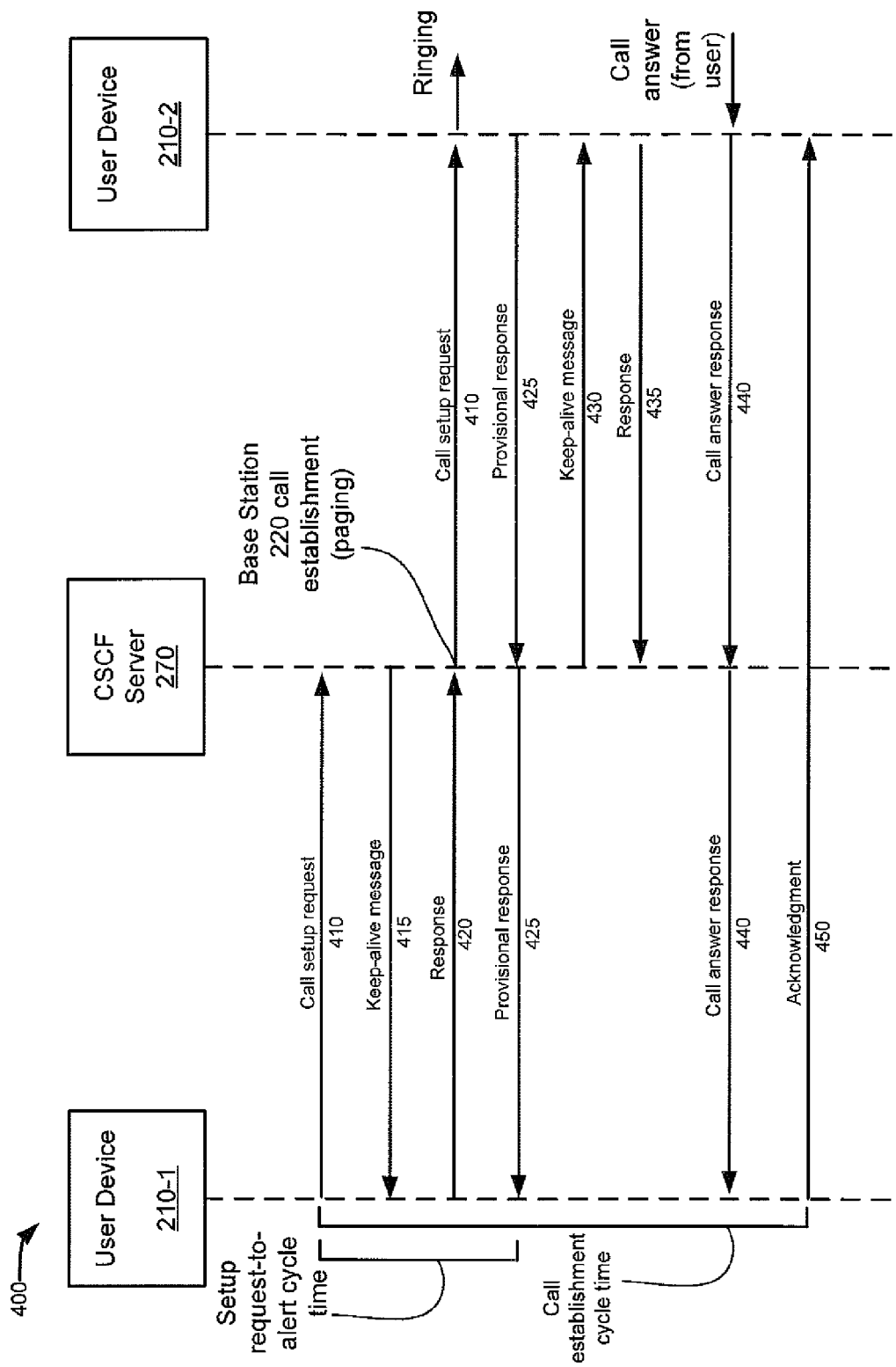
FIG. 4 illustrates a call flow diagram of example operations capable of being performed by an example portion of the environment of FIG. 2.

FIG. 4 illustrates a call flow diagram of example operations capable of being performed by an example portion 400 of environment 200. As shown in FIG. 4, portion 400 may include user device 210-1, user device 210-2, and CSCF server 270. User device 210-1, user device 210-2, and CSCF server 270 may include components and/or perform functions described above in connection with, for example, one or more of FIGS. 1-3. FIG. 4 may correspond to example operations to provide one or more keep-alive messages to user device 210-1 and/or to user device 210-2 to prevent user device 210-1 and/or user device 210-2 from disconnecting from base station 220. While not shown in FIG. 4, user device 210-1 and user device 210-2 may connect with one or more base stations 220 to transmit/receive data flows to/from user device 210-1, CSCF server 270, and user device 210-2.

In FIG. 4, assume that user device 210-1 is a sending user device 210 and that user device 210-2 is a receiving user device 210. Further, assume that user device 210-1 and user device 210-2 connect to CSCF server 270 via respective base stations 220. Given these assumptions, user device 210-1 may provide call setup request 410 towards user device 210-2. For example, a user of user device 210-1 may instruct user device 210-1 to provide call setup request 410 (e.g., to allow the user to place a call to user device 210-2). In some implementations, call setup request 410 may include a telephone number, associated with user device 210-2, and/or some other information to identify user device 210-2 or related to the call. In some implementations, call setup request 410 may be a session initiation protocol (SIP) invite signaling message and/or some other type of call setup request message. In some implementations, call setup request 410 may correspond to setting up a VoIP call, a video call, a voice call, and/or some other type of call.

In some implementations, CSCF server 270 may receive call setup request 410 and may provide call setup request 410 to user device 210-2 (e.g., via base station 220). In an implementation where user device 210-2 is to receive call setup request 410 via base station 220 and when user device 210-2 is not connected to base station 220 (e.g., when a connection timeout period between user device 210-2 and base station 220 has elapsed), base station 220 may page user device 210-2 (e.g., via MME 240) and to establish a radio connection with user device 210-2 in order to send the call setup request 410 to user device 210-2. In some implementations, user device 210-2 may sound a ringer and/or display an indication to alert a user of user device 210-2 of an incoming call based on receiving call setup request 410. In some implementations, user device 210-2 may provide provisional response 425 (e.g., 180 Altering message associated with a SIP protocol) to user device 210-1 indicating call setup request 410 has been received and that a user of user device 210-2 (e.g., a called user) is being alerted. When user device 210-1 receives provisional response 425 from user device 210-2, user device 210-1 may provide an audible ring-back tone to the user of user device 210-1 (e.g., via a speaker of user device 210-1) indicating user device 210-2 has received call setup request 410 and that user device 210-2 is ringing.

In some implementations, CSCF server 270 may provide keep-alive message 415 to user device 210-1 based on receiving call setup request 410. For example, CSCF server 270 may start a timer based on receiving call setup request 410 and may provide keep-alive message 415 at a time prior to a timeout period in which base station 220 disconnects from user device 210-1. In some implementations, the time at which CSCF server 270 provides keep-alive message 415 may be based on the timeout period and/or transmission times associated with call setup request 410 and keep-alive message 415. As an example, assume that the timeout period is five (5) seconds. Further, assume that CSCF server 270 allows for one (1) second of transmission time to compensate for the transmission of call setup request 410. Further, assume that CSCF server 270 allows for one (1) second of transmission time to compensate for the transmission of keep-alive message 415. Given these assumptions, CSCF server 270 may provide keep-alive message 415 within three (3) seconds of receiving call setup request 410.

In some implementations, keep-alive message 415 may be a SIP OPTION message, a SIP NOTIFY message, a SIP INFO message, an HTTP ping message, and/or some other type of message. In some implementations, keep-alive message 415 may be provided at recurring intervals, corresponding to the timeout period, to refresh a connection between user device 210-1 and base station 220. For example, base station 220 may reset an inactivity timer when user device 210-1 transmits/receives a particular threshold amount of data via base station 220, such as when keep-alive message 415 is provided to user device 210-1. As a result, keep-alive message 415 may prevent base station 220 from disconnecting from user device 210-1.

As shown in FIG. 4, user device 210-1 may provide response 420 to CSCF server 270 based on receiving keep-alive message 415. In some implementations, response 420 may be a SIP 200 OK message to indicate to CSCF server 270 that keep-alive message 415 was received successfully. Additionally, or alternatively, response 420 may be some other type of message. For example, when keep-alive message 415 is an HTTP ping type message, response 420 may include a ping response. In some implementations, response 420 may not be provided (e.g., when CSCF server 270 does not require or request response 420).

In some implementations, user device 210-2 may provide provisional response 425 towards user device 210-1 upon receiving call setup request 410. In some implementations, provisional response 425 may be a SIP 180 message or some other type of message that indicates to user device 210-1 that user device 210-2 has received the call setup request 410 and that a response to call setup request 410 is pending. As shown in FIG. 4, CSCF server 270 may receive provisional response 425 and send provisional response 425 to user device 210-1. As described above, user device 210-1 may receive one or more keep-alive messages 415 to prevent user device 210-1 from disconnecting from base station 220. As a result, user device 210-1 may receive provisional response 425 without a delay associated with reestablishing a radio connection with base station 220, thereby reducing a cycle time from when user device 210-1 provides call setup request 410 to when user device 210-1 receives provisional response 425 from user device 210-2 (e.g., a setup request-to-alert cycle time). In some implementations, a reduction in the setup request-to-alert cycle time (e.g., post dial delay) may result in a reduction in cycle time in establishing a call between user device 210-1 and user device 210-2.

In some implementations, CSCF server 270 may provide keep-alive message 430 to user device 210-2 based on receiving provisional response 425 from user device 210-2. In some implementations, CSCF server 270 may provide keep-alive message 430 based on providing call setup request 410 to user device 210-2. In some implementations, keep-alive message 430 may be a SIP OPTION message, a SIP NOTIFY message, a SIP INFO message, an HTTP ping message, and/or some other type of message. In some implementations, keep-alive message 430 may be provided at regular intervals, corresponding to a timeout period, to refresh a connection between user device 210-2 and base station 220.

In some implementations, user device 210-2 may provide response 435 to CSCF server 270 based on receiving keep-alive message 430, according to the protocol of the keep-alive message. In some implementations, response 435 may be a SIP 200 OK message when a SIP OPTION or SIP INFO message is used as keep-alive message to indicate to CSCF server 270 that keep-alive message 430 was received successfully. Additionally, or alternatively, response 435 may be some other type of message. In some implementations, response 435 may not be provided (e.g., when CSCF server 270 does not require or request response 435).

In some implementations, user device 210-2 may provide call answer response 440 towards user device 210-1 based on receiving an instruction from a user of user device 210-2 to answer an incoming call. In some implementations, call answer response 440 may be a SIP 200 OK message or some other type of message to indicate to user device 210-1 that call setup request 410 has been accepted.

As described above, user device 210-1 may receive one or more keep-alive messages 415 to prevent user device 210-1 from disconnecting from base station 220. As a result, user device 210-1 may receive call answer 440 (e.g., via CSCF server 270 and base station 220) without a delay associated with reestablishing a connection with base station 220. In some implementations, CSCF server 270 may discontinue providing keep-alive messages 415 based on providing call answer response 440 to user device 210-1. For example, CSCF server 270 may discontinue providing keep-alive messages 415 to reduce network traffic when keep-alive messages 415 are no longer needed to prevent inactivity, such as when user device 210-1 is sending/receiving voice packets via the base station when communicating with user device 210-2 during the call. In some implementations, CSCF server 270 may start providing keep-alive message 430 based on providing provisional response 425 to user device 210-1. Additionally or alternatively, CSCF server 270 may discontinue providing keep-alive messages 415 to allow base station 220 to disconnect from user device 210-1 when a delay in transmitting/processing call setup request 410 occurs and/or when a device in environment 200 becomes overloaded or fails.

As further shown in FIG. 4, user device 210-2 may receive one or more keep-alive messages 430 to prevent user device 210-2 from disconnecting from base station 220. As a result, user device 210-2 may send call answer response 440 to user device 210-1 without a delay associated with reestablishing a connection with base station 220. In some implementations, user device 210-2 may send acknowledgment 450 to user device 210-2 to acknowledge the receipt of call answer response 440 (e.g., when SIP signaling is used to setup the call).

In some implementations, a reduction in the answer cycle time (from when user device 210-2 has provided call answer response 440 to when user device 210-1 receives the call answer 440) may correspond to a reduction in instances of voice-clipping that may occur when initial voice packets, provided by user device 210-2 to user device 210-1, are not received by user at user device 210-1 because user device 210-1 is disconnected from base station 220. In some implementations, a cycle time to establish a call session between user device 210-1 and user device 210-2 may be reduced as a result of providing keep-alive messages 415 and 430. In some implementations, CSCF server 270 may discontinue providing keep-alive messages 430 based on sending call answer response 440 to user device 210-2. For example, CSCF server 270 may discontinue providing keep-alive messages 430 to reduce network traffic when keep-alive messages 430 are no longer needed to prevent inactivity, such as when user device 210-2 is transmitting/receiving data/signals to communicate with user device 210-1 via base station 220.

While a particular series of operations and/or data flows have been described above with regard to FIG. 4, the order of the operations and/or data flows may be modified in other implementations. Further, non-dependent operations may be performed in parallel. Also, while a single CSCF server 270 is shown in FIG. 4 for clarity, in practice, multiple CSCF servers 270 may be implemented when user device 210-1 and user device 210-2 connect with different base stations 220 that service different geographic areas. For example, user device 210-1 may connect to a first CSCF server 270 via a first base station 220, whereas user device 210-2 may connect to a second CSCF server 270 via a second base station 220. In some implementations, user device 210-1 and user device 210-2 may transmit/receive data flows via base stations 220 and via CSCF servers 270 connected with user device 210-1 and user device 210-2. Also, some of the data flows may be omitted, for example, when user device 210-2 does not connect with CSCF server 270 to transmit/receive data flows (e.g., when user device 210-2 includes a landline telephone that connects with network 280 to transmit/receive data flows).

In some implementations, keep-alive message 415 may be provided at some other time than what is shown in FIG. 4. For example, keep-alive message 415 may be provided after provisional response 425 is received to allow user device 210-1 to be disconnected from base station 220 due to inactivity and to reduce network traffic. In some implementations, keep-alive message 415 may be provided after provisional response 425 has not been received at user device 210-1 for a substantial amount of time (e.g., larger than the inactivity timer in the base station 220) after user device 210-1 sending call setup request 410, such as when call setup request 410 is directed to an international telephone number or when user device 210-2 may require substantial time to receive/process call setup request 410.

In some implementations, CSCF server 270 may determine that user device 210-2 may require substantial time to receive/process call setup request 410 based on a telephone number of user device 210-2, based on an identifier of a base station 220 connected to user device 210-2, and/or based on some other information that may indicate that user device 210-2 may require substantial time to receive and/or process call setup request 410. For example, CSCF server 270 may determine that user device 210-2 may require substantial time to receive/process call setup request 410 when user device 210-2 is associated with an international telephone number and/or connected to a base station 220 that is further than a particular threshold distance from a base station 220 connected to user device 210-1. In some implementations, keep-alive message 415 may be provided to user device 210-1 after provisional response 425 is received by user device 210-1 to cause user device 210-1 to remain connected to base station 220 to receive call answer response 440 without delay to reduce the answer cycle time.

While FIG. 4 describes CSCF server 270 as providing keep-alive messages to user device 210-1 and user device 210-2, in practice, some other device may provide the keep-alive messages. For example, base station 220 may provide the keep-alive messages. Additionally, or alternatively, user device 210 may provide keep-alive messages (e.g., to base station 220 and/or to any destination via base station 220) to maintain a radio connection with base station 220.

Figure 5A:
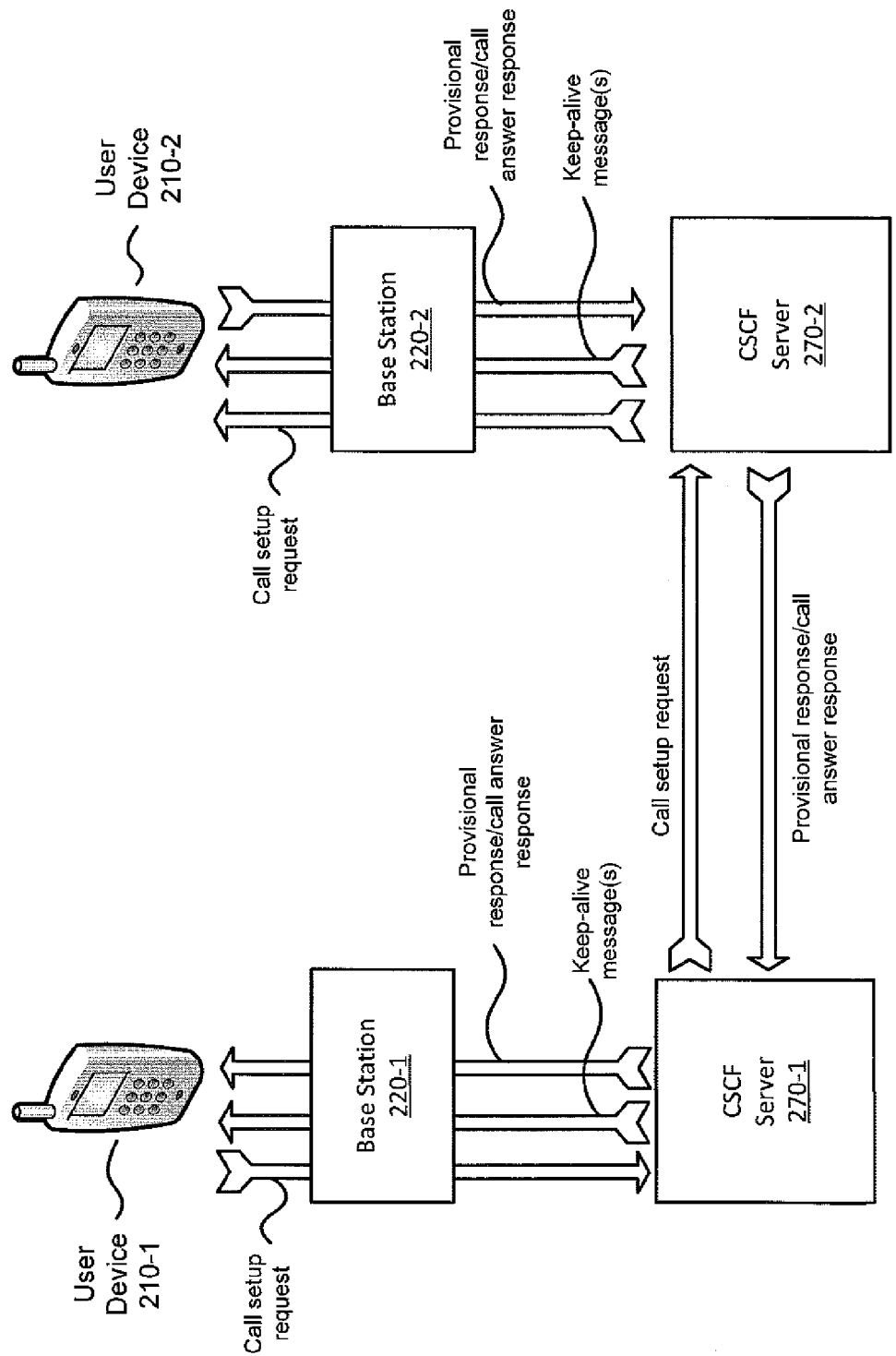
Figure 5B:
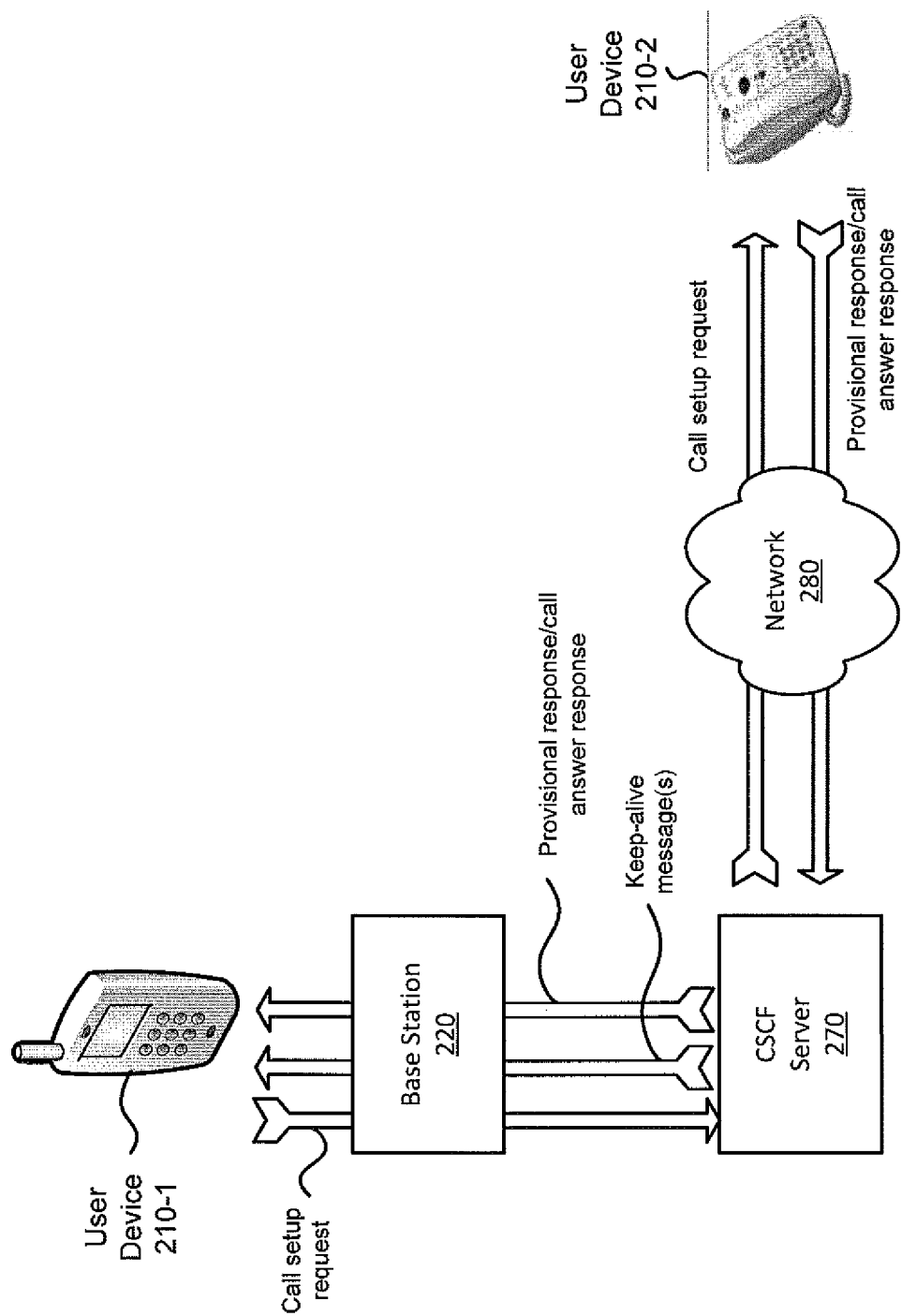

FIGS. 5A-5C illustrate example implementations as described herein. In FIG. 5A, assume that user device 210-1 connects with base station 220-1 to transmit/receive data and that user device 210-1 provides a call setup request towards user device 210-2 (e.g., when a user of user device 210-1 instructs user device 210-1 to place a call to user device 210-2). Further, assume that base station 220-1 communicates with CSCF server 270-1 to transmit/receive call-related data. Further, assume that user device 210-2 connects with base station 220-2 to transmit/receive data and that base station 220-2 communicates with CSCF server 270-2 to transmit/receive call-related data. Given these assumptions, CSCF server 270-1 may receive the call setup request (e.g., via base station 220-1) and may provide one or more keep-alive messages at an interval corresponding to a timeout period associated with base station 220-1. For example, as described above, CSCF server 270-1 may store the timeout period of base station 220-1 and may provide the one or more keep-alive messages to user device 210-1 to refresh a connection between base station 220-1 and user device 210-1, such that base station 220-1 does not disconnect user device 210-1 due to inactivity.

As further shown in FIG. 5A, CSCF server 270-1 may provide the call setup request towards user device 210-2 on behalf of user device 210-1. In some implementations, CSCF server 270-2 may receive the call setup request and provide the call setup request to user device 210-2 via base station 220-2. Additionally, CSCF server 270-2 may provide one or more keep-alive messages to user device 210-2 to prevent user device 210-2 from disconnecting from base station 220-2. In some implementations, CSCF server 270-2 may provide keep-alive messages at a different interval than keep-alive messages provided by CSCF server 270-1 (e.g., when base station 220-1 is associated with a different timeout period than that of base station 220-2).

In some implementations, user device 210-2 may provide a provisional response and a call answer response (e.g., based on receiving the call setup request) towards user device 210-1 (e.g., when a user of user device 210-2 instructs user device 210-2 to answer the call invite). In some implementations, responses may be provided to user device 210-1 via base station 220-2, CSCF server 270-2, CSCF server 270-1, and/or base station 220-1. As described above, user device 210-1 may receive one or more keep-alive messages to prevent user device 210-1 from disconnecting with base station 220-1. As a result, user device 210-1 may receive the provisional response and a call answer response without needing to reestablish a connection with base station 220-1. Further, since user device 210-2 receives one or more keep alive messages to prevent user device 210-2 from disconnecting with base station 220-2, user device 210-2 may send the call answer response without needing to reestablish a radio connection with base station 220-2.

In some implementations (e.g., when either user device 210-1 or user device 210-2 does not connect with base station 220), CSCF server 270 may provide user device 210-1 or user device 210-2 with one or more keep-alive messages to prevent user device 210-1 or user device 210-2 from disconnecting with base station 220, thereby reducing a cycle time associated with establishing a call session between user device 210-1 and user device 210-2. For example, referring to FIG. 5B, user device 210-1 may connect to base station 220 to provide a call setup request to user device 210-2 (e.g., a user device 210 that is not connected to base station 220, such as a landline telephone).

As shown in FIG. 5B, CSCF server 270 may provide one or more keep-alive messages to user device 210-1 to prevent user device 210-1 from disconnecting from base station 220. In some implementations, user device 210-2 may receive the call setup request via base station 220, CSCF server 270, and network 280. In some implementations, user device 210-2 may provide a provisional response (e.g., based on receiving the call setup request). In some implementations, user device 210-2 may provide a call answer response towards user device 210-1 (e.g., when a user of user device 210-2 answers the call setup request). In some implementations, user device 210-1 may receive the provisional response and/or the call answer response (e.g., via CSCF server 270 and base station 220) without needing to reestablish a connection with base station 220 since user device 210-1 remains connected to base station 220, thereby reducing a cycle time for establishing a call between user device 210-1 and user device 210-2.

In some implementations (e.g., when user device 210-1 does not connect with base station 220 and when user device 210-2 connects with base station 220), CSCF server 270 may provide one or more keep-alive messages to user device 210-2 to prevent user device 210-2 from disconnecting with base station 220. For example, referring to FIG. 5C, user device 210-1 (e.g., a user device 210 that does not connect to base station 220, such as a landline telephone) may provide a call setup request towards user device 210-2 (e.g., via network 280). In some implementations, CSCF server 270 may provide the call setup request to user device 210-2 (e.g., via base station 220) and may provide one or more keep-alive messages to user device 210-2 to prevent user device 210-2 from disconnecting with base station 220. As a result, user device 210-2 may provide the call answer response to user device 210-1 without delay, thereby reducing a cycle time for establishing a call between user device 210-1 and user device 210-2 corresponding to a reduction in voice-clipping.

As described above, user device 210 may receive one or more keep-alive messages to prevent user device 210 from disconnecting from base station 220. In some implementations, a sending user device 210 may receive the keep-alive messages to reduce a delay in receiving a provisional response from a receiving user device 210 (e.g., a 180 SIP message, an early media message for audible ring-back tone, and/or some other type of message that notifies the sending user device 210 that the receiving user device 210 has received the call setup request). In some implementations, the receiving user device 210 may receive the keep-alive messages to reduce a delay in providing a call answer response to the sending user device 210, thereby reducing instances of voice-clipping. Also, the keep-alive messages may reduce a cycle time relating to establishing a call between user device 210-1 and user device 210-2.

In some implementations, the keep-alive messages may be provided to user device 210 to prevent user device 210 from disconnecting from some other type of network device other than base station 220. For example, the keep-alive messages may be provided to prevent user device 210 from disconnecting from a router, a switch, an access point, a gateway, or the like, associated with a wireless access network.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
    receiving, by a server device, a call setup request from a first user device that is destined for a second user device;
    providing, by the server device, the call setup request towards the second user device;
    receiving, by the server device, a provisional response from the second user device destined for the first user device based on providing the call setup request towards the second user device,
        the provisional response indicating that the second user device has received the call setup request;
    providing, by the server device, the provisional response towards the first user device,
        the first user device or the second user device being connected to a base station to allow the first user device or the second user device to provide or receive the call setup request, the provisional response, a response to the call setup request, or an acknowledgement associated with the response to the call setup request; and
    providing, by the server device and based on receiving the call setup request or based on receiving the provisional response, one or more messages towards the first user device or towards the second user device to prevent the first user device or the second user device from disconnecting from the base station to reduce a delay in receiving, by the first user device or the second user device, the provisional response, the response to the call setup request, or the acknowledgement.

2. The method of claim 1, further comprising:
    receiving, from the second user device, the response to the call setup request based on providing the call setup request towards the second user device,
        the response to the call setup request indicating that the second user device accepts the call setup request;
    providing the response to the call setup request towards the first user device;
    receiving, from the first user device, the acknowledgement based on providing the response to call setup request;
    providing the acknowledgement towards the second user device; and causing a call session to be established between the first user device and the second user device based on providing the response to the call setup request or based on providing the acknowledgement.

3. The method of claim 2, further comprising:
discontinuing providing the one or more messages based on providing the response to the call setup request or providing the acknowledgement.

4. The method of claim 1, further comprising:
storing information that identifies an inactivity time period associated with the base station,
  the inactivity time period corresponding to a particular amount of time in which the base station disconnects from the first user device or the second user device when the first user device or the second user device provides or receives less than a particular threshold amount of data via the base station during the particular amount of time;
where providing the one or more messages includes providing the one or more messages at recurring time intervals corresponding to the inactivity time period.

5. The method of claim 1, where the first user device and the second user device are connected to the base station,
where the one or more messages are provided to the first user device and the second user device.

6. The method of claim 1, where the first user device is connected to the base station and the second user device is not connected to a base station,
where the one or more messages are provided to the first user device and are not provided to the second user device.

7. The method of claim 1, where the first user device is not connected to the base station and the second user device is connected to base station,
where the one or more messages are not provided to the first user device and are provided to the second user device.

8. The method of claim 1, further comprising:
determining whether the second user device requires more than a threshold amount of time to receive or process the call setup request;
providing the one or more messages to the first user device after receiving the provisional response and based on determining that the second user device requires more than the threshold amount of time to receive or process the call setup request; and
providing the one or more messages to the first user device after receiving the call setup request and based on determining that the second user device does not require more than the threshold amount of time to receive or process the call setup request.

9. A server device comprising:
one or more processors, coupled to a memory, to:
  receive a call setup request from a first user device that is destined for a second user device;
  provide the call setup request towards the second user device;
  receive a provisional response from the second user device destined for the first user device based on providing the call setup request towards the second user device,
    the provisional response indicating that the second user device has received the call setup request;
  provide the provisional response towards the first user device,
    the first user device or the second user device being connected to a network device to allow the first user device or the second user device to provide or receive the call setup request, the provisional response, a response to the call setup request, or an acknowledgement associated with the response to the call setup request; and
  provide, based on receiving the call setup request or based on receiving the provisional response, one or more messages towards the first user device or towards the second user device to prevent the first user device or the second user device from disconnecting from the network device to reduce a delay in receiving, by the first user device or the second user device, the provisional response, the response to the call setup request, or the acknowledgement.

10. The server device of claim 9, where the one or more processors are further to:
receive, from the second user device, the response to the call setup request based on providing the call setup request towards the second user device,
  the response to the call setup request indicating that the second user device accepts the call setup request;
provide the response to the call setup request towards the first user device;
receive, from the first user device, the acknowledgement based on providing the response to call setup request;
provide the acknowledgement towards the second user device; and
cause a call session to be established between the first user device and the second user device based on providing the response to the call setup request or based on providing the acknowledgement.

11. The server device of claim 9, where the one or more processors are further to:
store information that identifies an inactivity time period associated with the network device,
  the inactivity time period corresponding to a particular amount of time in which the network device disconnects from the first user device or the second user device when the first user device or the second user device provides or receives less than a particular threshold amount of data via the network device during the particular amount of time;
where when providing the one or more messages, the one or more processors are further to provide the one or more messages at recurring time intervals corresponding to the inactivity time period.

12. The server device of claim 9, where the first user device and the second user device are connected to network device,
where the one or more processors are to provide the one or more messages to the first user device and the second user device.

13. The server device of claim 9, where the first user device is connected to the network device and the second user device is not connected to base station or the network device,
where the one or more processors are to provide the one or more messages to the first user device and not provide the one or more messages to the second user device.

14. The server device of claim 9, where the first user device is not connected to the network device and the second user device is connected to the network device,
where the one or more processors are not to provide the one or more messages to the first user device and is to provide the one or more messages to the second user device.

15. The server device of claim 9, where the one or more processors are further to:

determine whether the second user device requires more than a threshold amount of time to receive or process the call setup request;

provide the one or more messages to the first user device after receiving the provisional response and based on determining that the second user device requires more than the threshold amount of time to receive or process the call setup request; and provide the one or more messages to the first user device after receiving the call setup request and based on determining that the second user device does not require more than the threshold amount of time to receive or process the call setup request.

16. A non-transitory computer-readable medium for storing instructions, the instructions comprising:

a plurality of instructions which, when executed by one or more processors of a server device, cause the one or more processors to:

receive a call setup request from a first user device that is destined for a second user device;

provide the call setup request towards the second user device;

receive a provisional response from the second user device destined for the first user device based on providing the call setup request towards the second user device, the provisional response indicating that the second user device has received the call setup request;

provide the provisional response towards the first user device, the first user device or the second user device being connected to a network device to allow the first user device or the second user device to provide or receive the call setup request, the provisional response, a response to the call setup request, or an acknowledgement associated with the response to the call setup request; and provide, based on receiving the call setup request or based on receiving the provisional response, one or more messages towards the first user device or towards the second user device to prevent the first user device or the second user device from disconnecting from the network device before a call session is established, between the first user device and second user device.

17. The non-transitory computer-readable medium of claim 16, where the plurality of instructions further cause the one or more processors to:

store information that identifies an inactivity time period associated with the network device, the inactivity time period corresponding to a particular amount of time in which the network device disconnects from the first user device or the second user device when the first user device or the second user device provides or receives less than a particular threshold amount of data via the network device during the particular amount of time;

where one or more instructions, of the plurality of instructions, to provide the one or more messages, further cause the one or more processors to provide the one or more messages at recurring time intervals corresponding to the inactivity time period.

18. The non-transitory computer-readable medium of claim 16, where the first user device and the second user device are connected to the network device, where the plurality of instructions further cause the one or more processors to provide the one or more messages to the first user device and the second user device.

19. The non-transitory computer-readable medium of claim 16, where the first user device is connected to the network device and the second user device is not connected to network device, where the plurality of instructions further cause the one or more processors to provide the one or more messages to the first user device and not provide the one or more messages to the second user device.

20. The non-transitory computer-readable medium of claim 16, where the first user device is not connected to the network device and the second user device is connected to network device, where the plurality of instructions further cause the one or more processors to provide the one or more messages to the second user device and not to provide the one or more messages to the first user device.

* * * * *